(12) United States Patent
Yi et al.

(10) Patent No.: US 8,600,294 B2
(45) Date of Patent: *Dec. 3, 2013

(54) SYSTEM AND METHOD FOR PERFORMING WEIGHTED PROCESSING ON UPLINK SIGNAL

(75) Inventors: Zheng Yi, Shenzhen (CN); Gengshi Wu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 318 days.

This patent is subject to a terminal disclaimer.

(21) Appl. No.: 12/944,484

(22) Filed: Nov. 11, 2010

(65) Prior Publication Data

US 2011/0130089 A1 Jun. 2, 2011

(30) Foreign Application Priority Data

Nov. 11, 2009 (CN) .......................... 2009 1 0212154

(51) Int. Cl.
*H04B 1/60* (2006.01)
(52) U.S. Cl.
USPC .................................. 455/9; 455/7; 370/315
(58) Field of Classification Search
USPC ......... 455/711.1, 12.1, 13.1, 427, 9; 370/315, 370/316; 375/211, 295, 296, 316, 346
See application file for complete search history.

(56) References Cited

U.S. PATENT DOCUMENTS 7,532,660 B2  5/2009 Chae et al.
8,331,425 B2 * 12/2012 Nicolas et al. ................ 375/219
2005/0018755 A1  1/2005 Chae et al.
2008/0002601 A1 *  1/2008 Coronel et al. ............... 370/315
2009/0268657 A1  10/2009 Angeliki et al.

FOREIGN PATENT DOCUMENTS

| CN | 1744458 (A) | 3/2006 |
|---|---|---|
| CN | 1830158 A | 9/2006 |
| CN | 101056130 A | 10/2007 |
| CN | 101350777 (A) | 1/2009 |
| EP | 1 638 236 A2 | 3/2006 |

(Continued)

OTHER PUBLICATIONS

3rd Generation Partnership Project, "Spatial Multiplexing of Type-2 L1 and L2 Relays," 3GPP TSG RAN WG1 Meeting #57, R1-091802, May 4-8, 2009, 7 pages.

(Continued)

*Primary Examiner* — Nay A Maung
*Assistant Examiner* — Angelica M Perez
(74) *Attorney, Agent, or Firm* — Slater & Matsil, L.L.P.

(57) ABSTRACT

An uplink signal weighted processing method is disclosed. A first channel impulse response from a Mobile Station (MS) to a relay station, and a second channel impulse response from the relay station to a Base Station (BS) are acquired. A relay weight and a demodulation weight are determined according to the first channel impulse response and the second channel impulse response. The relay weight is sent to the relay station and the demodulation weight is sent to the BS, so as to enable the relay station to perform weighted processing on an MS uplink signal received by the relay station according to the relay weight to obtain an uplink relay weighted signal and to send the uplink relay weighted signal to the BS, and so as to enable the BS to perform demodulation weighted processing on the uplink relay weighted signal received by the BS according to the demodulation weight to obtain an uplink estimation signal corresponding to the MS uplink signal.

17 Claims, 8 Drawing Sheets

(56) References Cited

FOREIGN PATENT DOCUMENTS

| EP | 1 845 634 A1 | 10/2007 |
| EP | 2 017 973 A1 | 1/2009 |
| WO | WO 2009/089654 A1 | 7/2009 |

OTHER PUBLICATIONS

3rd Generation Partnership Project, "Technical Specification Group Radio Access Network; Feasability Study for Further Advancements for E-UTRA (LTE-Advanced)," 3GPP TR 36.912 V9.0.0, Release 9, Sep. 2009, pp. 1-55.

Extended European Search Report, European Application No. 10188760.2-2411/2323274, Applicant: Huawei Device Co., Ltd., Dated: Jul. 6, 2011, 9 pages.

First Chinese Office Action and Partial English Translation received in Chinese Application No. 200910212154.6, mailed Feb. 27, 2013, 10 pages.

* cited by examiner

CONT FROM FIG. 2A

a iterative value of the relay weight at the time of the threshold value of the uplink SINR is reached and a total transmission power of the relays is minimum is redetermined according to the iterative value of the demodulation weight, an iterative value of the demodulation weight is redetermined according to the redetermined iterative value of the relay weight, the threshold value of the uplink SINR, and the second channel impulse response, and the iteration is repeated till the minimal value of the total transmission power of the relay stations is converged into a fixed value. ⟋ 25 a iterative value of the relay weight and a iterative value of the demodulation weight at the time of the minimal value of the total transmission power of the relay stations is converged into a certain fixed value are respectively determined as the relay weight and the demodulation weight. ⟋ 26

FIG. 2B

SYSTEM AND METHOD FOR PERFORMING WEIGHTED PROCESSING ON UPLINK SIGNAL

This application claims priority to Chinese Patent Application 200910212154.6, which was filed Nov. 11, 2009 and is incorporated herein by reference in its entirety.

TECHNICAL FIELD

The present invention relates to the field of communication technology, and more particularly to a system and a method for performing weighted processing on uplink signal.

BACKGROUND

A Next Generation Network (NGN) raises much higher requirements on spectrum efficiency and power efficiency. Compared with a conventional cellular network, a relay mobile network can efficiently improve the network coverage quality, thus providing a solution of high performance-price ratio for achieving broadband wireless access at high frequency band.

In the relay mobile network, a plurality of relay stations may work cooperatively to form a virtual array, and a Mobile Station (MS) may be connected to a radio network through a Base Station (BS) in collaboration with the plurality of relay stations. In the prior art, an uplink transmission vector of the relay mobile network is generally optimized by an MS, and an uplink signal is sent according to the optimized uplink transmission vector, so as to satisfy an uplink Signal to Noise Ratio (SINR) needed for receiving signals of each user by a BS.

The inventors find in the process of implementing the present invention that there is no technical means in the prior art to optimize the network capacity and ensure the communication quality by optimizing a transmitted signal of a relay station.

SUMMARY OF THE INVENTION

The present invention is directed to an uplink signal weighted processing method, an uplink signal weighted processing device, and a communication system, so as to facilitate the improvement of the network capacity and the improvement of the communication quality.

One aspect of the present invention is to provide an uplink signal weighted processing method, which includes acquiring a first channel impulse response from an MS to a relay station, and a second channel impulse response from the relay station to a BS. A relay weight and a demodulation weight are determined according to the first channel impulse response and the second channel impulse response. The relay weight and the demodulation weight are sent to the relay station and the BS, so as to enable the relay station to perform weighted processing on an MS uplink signal received by the relay station according to the relay weight to obtain an uplink relay weighted signal and send the uplink relay weighted signal to the BS, and enable the BS to perform demodulation weighted processing on the uplink relay weighted signal received by the BS according to the demodulation weight to obtain an uplink estimation signal corresponding to the MS uplink signal.

Another aspect of the present invention is to provide an uplink signal weighted processing device, which includes an acquisition module, a weight determination module, and a weighted processing module.

The acquisition module is configured to acquire a first channel impulse response from an MS to a relay station and a second channel impulse response from the relay station to a BS.

The weight determination module is configured to determine a relay weight and a demodulation weight according to the first channel impulse response and the second channel impulse response.

The weighted processing module is configured to send the relay weight and the demodulation weight respectively to the relay station and the BS, so as to enable the relay station to perform weighted processing on an MS uplink signal received by the relay station according to the relay weight to obtain an uplink relay weighted signal and send the uplink relay weighted signal to the BS, and enable the BS to perform demodulation weighted processing on the uplink relay weighted signal according to the demodulation weight to obtain an uplink estimation signal corresponding to the MS uplink signal.

Another aspect of the present invention is to provide a communication system, which includes a BS, a relay station, an MS, and an uplink signal weighted processing device.

The uplink signal weighted processing device is configured to acquire a first channel impulse response from an MS to a relay station and a second channel impulse response from the relay station to a BS, determine a relay weight and a demodulation weight according to the first channel impulse response and the second channel impulse response, and send the relay weight and the demodulation weight respectively to the relay station and the BS.

The relay station is configured to perform weighted processing on an MS uplink signal received by the relay station according to the relay weight to obtain an uplink relay weighted signal, and send the uplink relay weighted signal to the BS.

The BS is configured to perform demodulation weighted processing on the uplink relay weighted signal according to the demodulation weight to obtain an uplink estimation signal corresponding to the MS uplink signal.

According to the embodiments of the present invention, the relay weight used for performing weighted processing on the MS uplink signal received by the relay station is determined for the relay station, and the demodulation weight used for performing demodulation weighted processing on the uplink relay weighted signal received by the BS is determined for the BS, that is, the uplink signal is respectively optimized at a relay station and a BS, thereby facilitating the optimization of the network capacity and the improvement of the communication quality.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

FIG. 2, which includes FIGS. 2A and 2B, is a flow chart of a method for determining a relay weight and a demodulation weight according to an embodiment of the present invention;

DETAILED DESCRIPTION OF ILLUSTRATIVE EMBODIMENTS

The technical solutions in the embodiments of the present invention will be clearly and completely described in the following with reference to the accompanying drawings. It is obvious that the described embodiments are only a part rather than all of the embodiments of the present invention. All other embodiments obtained by persons skilled in the art based on the embodiments of the present invention without creative efforts shall fall within the protection scope of the present invention.

Figure 1:
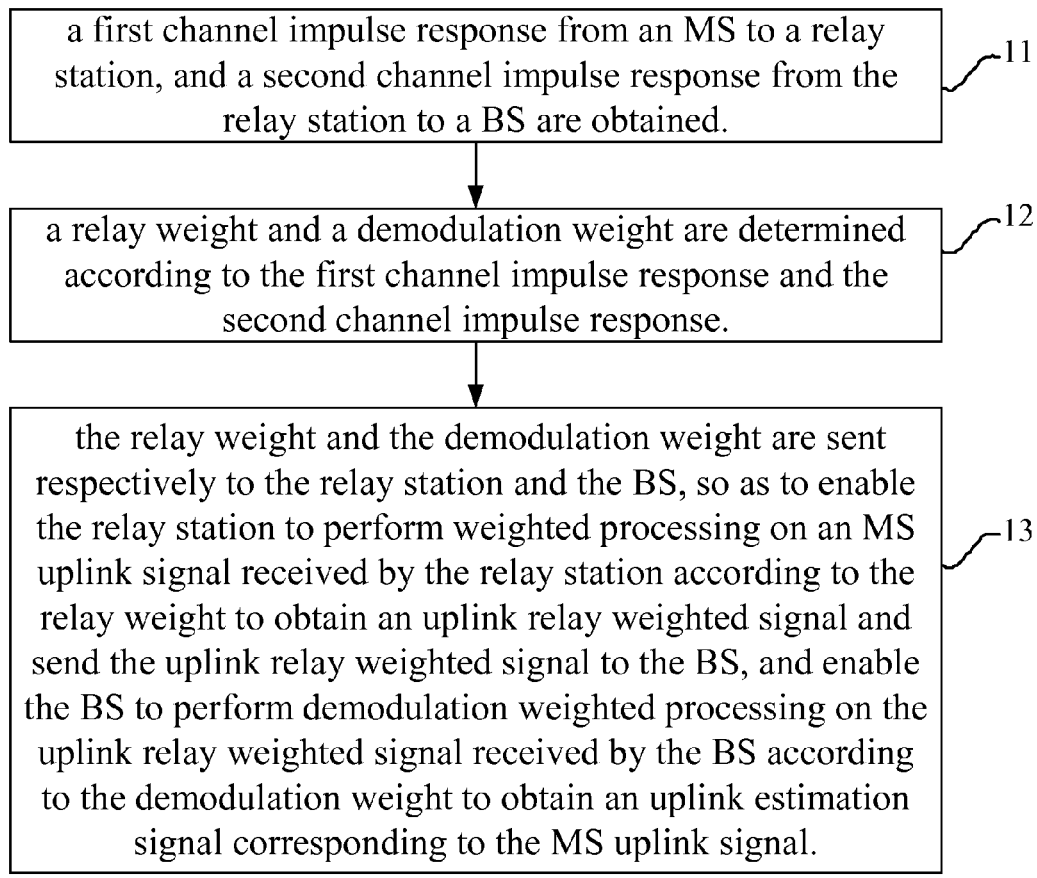
FIG. 1 is a flow chart of an uplink signal weighted processing method according to an embodiment of the present invention.

FIG. 1 is a flow chart of an uplink signal weighted processing method according to an embodiment of the present invention. As shown in FIG. 1, in this embodiment, the uplink signal weighted processing method includes the following blocks.

In Block 11, a first channel impulse response from an MS to a relay station, and a second channel impulse response from the relay station to a BS are obtained.

The first channel impulse response may be obtained through detection by the relay station. Both the second channel impulse response from the relay station to the BS and a relay transmission signal received by the BS may be obtained through the detection by the BS, and the obtained second channel impulse response and relay transmission signal received by the BS are sent to the relay station.

In Block 12, a relay weight and a demodulation weight are determined according to the first channel impulse response and the second channel impulse response.

The relay weight is used for performing weighted processing on a received MS uplink signal by the relay station, and the demodulation weight is used for performing demodulation weighted processing on the received relay uplink signal by the BS. An update cycle of the relay weight and the demodulation weight may be set according to the practical demand, and the relay weight and the demodulation weight may be dynamically updated with the update cycle as the time interval.

In Block 13, the relay weight and the demodulation weight are sent respectively to the relay station and the BS, so as to enable the relay station to perform weighted processing on an MS uplink signal received by the relay station according to the relay weight to obtain an uplink relay weighted signal and send the uplink relay weighted signal to the BS, and enable the BS to perform demodulation weighted processing on the uplink relay weighted signal received by the BS according to the demodulation weight to obtain an uplink estimation signal corresponding to the MS uplink signal.

According to this embodiment, in the uplink weighted processing method, the relay weight used for performing weighted processing on the MS uplink signal received by the relay station is determined for the relay station, and the demodulation weight used for performing demodulation weighted processing on the uplink relay weighted signal received by the BS is determined for the BS, that is, the uplink signal is optimized at a relay station and a BS, thereby facilitating the optimization of the network capacity and the improvement of the communication quality.

Figure 2A:
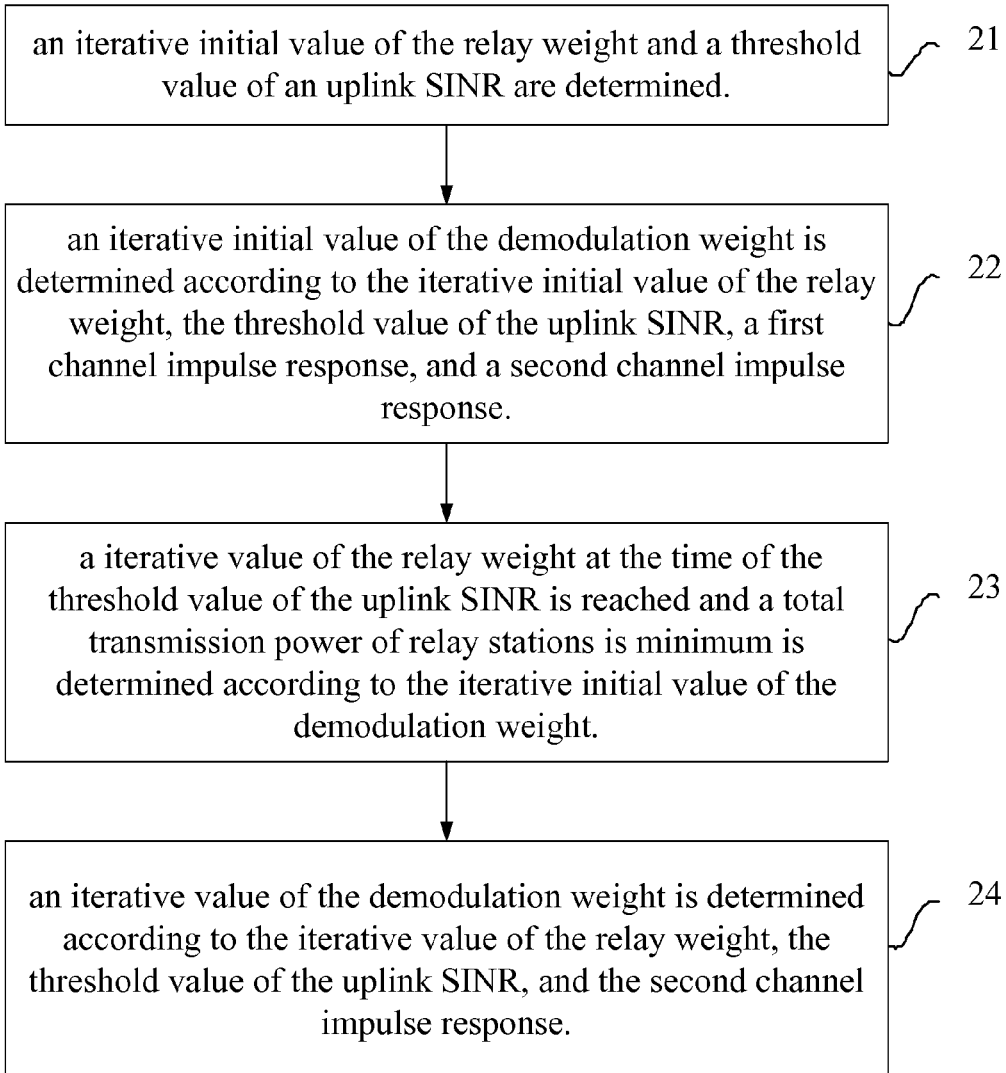

FIG. 2 is a flow chart of a method for determining a relay weight and a demodulation weight according to an embodiment of the present invention. As shown in FIG. 2, the method for determining the relay weight and the demodulation weight includes the following blocks.

In Block 21, an iterative initial value of the relay weight and a threshold value of an uplink SINR are determined.

In Block 22, an iterative initial value of the demodulation weight is determined according to the iterative initial value of the relay weight, the threshold value of the uplink SINR, a first channel impulse response, and a second channel impulse response.

In Block 23, an iterative value of the relay weight is determined according to the iterative initial value of the demodulation weight, where the iterative value of the relay weight is of the time the threshold value of the uplink SINR is reached and a total transmission power of relay stations is minimum.

Optionally, in this block, an iterative value of the relay weight may be further determined according to the iterative initial value of the demodulation weight, where the iterative value of the relay weight is of the time the threshold value of the uplink SINR is reached, a total transmission power of the relay stations is minimum, and a transmission power of any relay station is equal to or lower than a preset threshold value.

In Block 24, an iterative value of the demodulation weight is determined according to the iterative value of the relay weight, the threshold value of the uplink SINR, and the second channel impulse response.

In Block 25, an iterative value of the relay weight is redetermined according to the iterative value of the demodulation weight, where the iterative value of the relay weight is of the time the threshold value of the uplink SINR is reached and a total transmission power of the relay stations is minimum, an iterative value of the demodulation weight is redetermined according to the redetermined iterative value of the relay weight, the threshold value of the uplink SINR, and the second channel impulse response, and the iteration is repeated till the minimal value of the total transmission power of the relay stations is converged into a fixed value.

Optionally, in Block 25, an iterative value of the relay weight may be further redetermined according to the iterative value of the demodulation weight, where the iterative value of the relay weight is of the time the threshold value of the uplink SINR is reached, a total transmission power of the relay stations is minimum, and a transmission power of any relay station is equal to or lower than the preset threshold value. Limited by physical conditions, the transmission power of each relay station cannot be infinitely increased. In this solution, the total transmission power of the relay stations and the transmission power of each relay station are comprehensively taken into consideration, such that the total transmission power of the relay station s is minimum and the transmission power of each relay station is not higher than a certain threshold vale while the threshold value of the uplink SINR is reached, thereby improving the feasibility of the solution.

In Block 26, an iterative value of the relay weight and an iterative value of the demodulation weight of the time the minimal value of the total transmission power of the relay stations is converged into a certain fixed value are respectively determined as the relay weight and the demodulation weight.

The relay station performs weighted processing on a received MS uplink signal according to the relay weight to obtain an uplink relay weighted signal, and send the uplink relay weighted signal and the demodulation weight to a BS. The BS performs demodulation weighted processing on the uplink relay weighted signal according to the demodulation weight, to obtain an uplink estimation signal corresponding to the MS uplink signal.

In this embodiment, the relay weight and the demodulation weight are jointly determined by using an iteration method, and weighted processing is respectively performed on the uplink signal according to the determined relay weight and demodulation weight, such that the total transmission power of the relay stations is minimal when the uplink signal sent from the MS reaches a preset threshold value of the SINR, thereby facilitating the optimization of the network capacity and the improvement of the communication quality. If an upper limit of the transmission power of each relay station is further considered in the joint determination of the relay weight and the demodulation weight, the reliability for achieving the solution may be further improved.

A theoretical basis of the method for determining the relay weight and the demodulation weight according to the embodiment of the present invention is described with reference to a specific application scenario.

Figure 3:
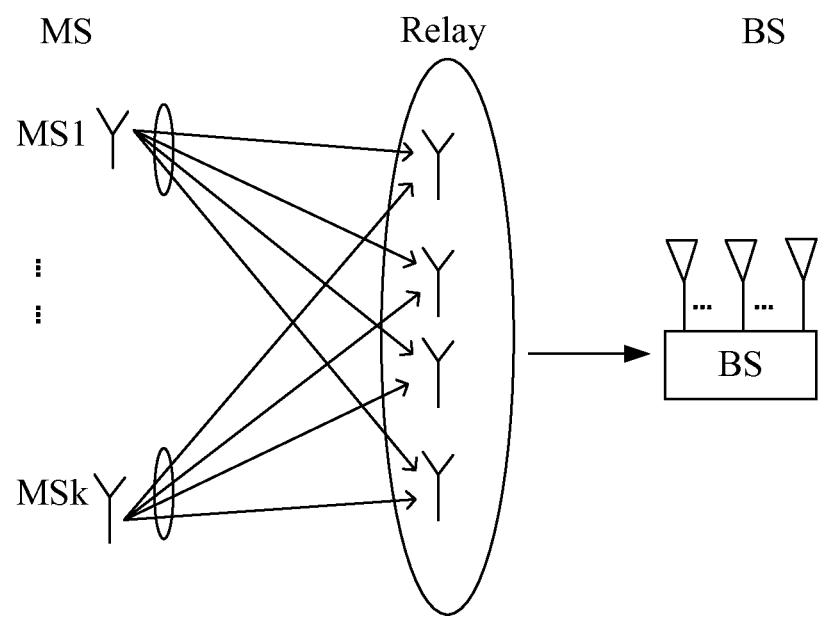
FIG. 3 is schematic structural view of a relay communication system in an application scenario according to an embodiment of the present invention.

FIG. 3 is schematic structural view of a relay communication system in an application scenario according to an embodiment of the present invention. As shown in FIG. 3, the relay communication system includes M single-antenna MSes (MS1-MSk), R single-antenna relay stations, and a BS having N antennas. The M single-antenna MSes (MS1-MSk), send signals to the BS having N antennas through the R single-antenna relay stations. The signal sent in a direction from the MS to the BS is an uplink signal.

In the application scenario as shown in FIG. 3, the uplink signal received by any relay station from each MS may be expressed as follows:

$$x_r = \sum_{i=1}^{M} f_{r,i} s_i + v_r \quad (1)$$

In Formula (1), $x_r$ represents an uplink signal received by an $r^{th}$ relay station from each MS; $s_i$ represents the uplink signal sent from an $i^{th}$ MS (i=0 . . . M−1) to the BS; $f_{r,i}$ represents an uplink channel impulse response between the $i^{th}$ MS and the $r^{th}$ relay station (that is, the first channel impulse response according to the embodiment of the present invention); and $v_r$ is a noise induced by the $r^{th}$ relay station.

Therefore, a vector of the uplink signal received by each relay station transmitted from the MSes may be expressed as follows:

$$x = \sum_{i=1}^{M} f_i s_i + v \quad (2)$$

in which:

$x = [x_1 x_2 \ldots x_R]^T$ $v = [v_1 v_2 \ldots v_R]$ $f_i = [f_{1,i} f_{2,i} \ldots f_{R,i}]$ After receiving the uplink signal sent from the MS, each relay station performs weighted processing on the received uplink signal, and sends the uplink signal after weighted processing to the BS. In the embodiment of the present invention, the uplink signal after weighted processing by the relay station is referred to as an uplink relay weighted signal. The uplink relay weighted signal from the relay station may be expressed as follows:

$$t = W^H x \quad (3)$$

in which:

$$W = \text{diag}(w_1, w_2, \ldots, w_R)$$

In Formula (3), t is vector expression of the uplink relay weighted signal from each relay station, $w_r$ represents a relay weight by which the $r^{th}$ relay station performs weighted processing on the received uplink signal, and W is vector expression of the relay weights.

A vector of an uplink relay weighted signal received by the BS may be expressed as follows.

$$y = Ht + n \quad (4)$$

In formula (4), y represents the uplink relay weighted signal received by the BS which is transmitted from the relay station, t represents the uplink relay weighted signal from each relay station, H represents an uplink channel impulse response from the relay station to the BS (that is, the second channel impulse response according to the embodiment of the present invention), and n represents a noise induced by an antenna of the BS which receives the uplink relay weighted signal.

The BS demodulates the received uplink relay weighted signal to obtain an uplink estimation signal, which may be regarded as an MS transmission signal, which is specifically expressed as follows.

$$\hat{s} = Gy = G\left(Hw^H\left(\sum_{i=1}^{M} f_i s_i + v\right) + n\right) \quad (5)$$

In Formula (5), $\hat{S}$ represents the uplink estimation signal demodulated by the BS, G represents a linear demodulation matrix, y represents the uplink relay weighted signal received by the BS which is transmitted from the relay station, H represents the uplink channel impulse response from the relay station to the BS, n represents the noise induced by the BS when receiving the uplink relay weighted signal, and v represents the noise induced by the relay station when transmitting the uplink relay weighted signal.

The Formula (5) is factorized as follows.

$$\hat{s}_k = \underbrace{g_k^T Hw^H f_k s_k}_{\text{Desired signal}} + \underbrace{g_k^T Hw^H \sum_{j=1, j \neq k}^{M} f_j s_j}_{\text{Interference}} + \underbrace{g_k^T Hw^H v + g_k^T n}_{\text{Colored noise}} \quad (6)$$

In Formula (6), $g_K^T$ represents a $k^{th}$ row of the linear demodulation matrix G. It can be known by analyzing Formula (6) that the uplink estimation signal demodulated by the BS mainly includes three parts: Desired Signal, Interference, and Colored noise. Therefore, an SINR of the uplink signal received by the BS which is transmitted from the $k^{th}$ MS is:

$$SINR_k = \frac{P_s^k}{P_i^k + P_n^k} \quad (7)$$

In Formula (7), $P_s^k$ is a signal power of the $k^{th}$ MS received by the BS, and $P_s^k$ may be determined by a formula as follows.

$$P_s^k = g_k^T H w^H E\{f_k f_k^H\} w H^H g_k^* E\{|s_k|^2\} \quad (8)$$
$$= P_k g_k^T H w^H R_f^k w H^H g_k^*$$

$R_f^k$ represents an autocorrelation matrix of the first channel impulse response from the $k^{th}$ MS to the $f^{th}$ relay station.

$P_i^k$ is an interference power of the $k^{th}$ MS received by the BS, and $P_i^k$ may be determined by a formula as follows.

$$P_i^k = E\left\{\left(g_k^T H w^H \sum_{j=1, j \neq k}^{M} f_j s_j\right)\left(g_k^T H w^H \sum_{j=1, j \neq k}^{M} f_j s_j\right)^H\right\} \quad (9)$$
$$= g_k^T H w^H \left(\sum_{j=1, j \neq k}^{M} P_j R_f^j\right) w H^H g_k^*.$$

$P_n^k$ is a colored noise power of the $k^{th}$ MS received by the BS, and $P_n^k$ may be determined by a formula as follows.

$$P_n^k = \sigma_v^2 g_k^T H w^H w H^H g_k^* + \sigma_n^2 g_k^T g_k^* \quad (10)$$

If the relay weight w* for the relay station to perform weighted processing on the received uplink signal is a certain fixed value, the SINR of the uplink signal received by the BS which is transmitted from each MS may be as follows.

$$SINR_k = \frac{g_k^T A g_k^*}{g_k^T B g_k^*} \quad (11)$$

$$A = P_k H w^H R_f^k w H^H$$

$$B = H w^H \left(\sum_{j=1, j \neq k}^{M} P_j R_f^j\right) w H^H + \sigma_v^2 H w^H w H^H + \sigma_n^2 I$$

In Formula (II), a maximal $SINR_k$ is equal to a maximal characteristic value of the demodulation matrix G, $g_k^*$ is a main characteristic vector corresponding to the maximal characteristic value, and $g_k^*$ may be determined by a formula as follows.

$$g_k^* = \wp\{B^{-1} A\} \quad (12)$$

In Formula (12), $\wp\{\}$ represents solution of a main characteristic vector;

w represents an initial value of a relay weight or an iterative value of a relay weight;

Tr(ZD) represents a total transmission power of the relay stations;

$R_f^k$ represents an autocorrelation matrix of the first channel impulse response from the $k^{th}$ MS to the $f^{th}$ relay station. $R_f^j$ represents an autocorrelation matrix of the first channel impulse response from a $j^{th}$ MS to the $f^{th}$ relay station. The superscript k or j represents a sequence number of the MS, $1 \leq k \leq M$, $1 \leq j \leq M$. M represents a total number of the MSes.

The subscript f represents a sequence number of the relay station, $1 \leq f \leq R$. R represents a total number of the relay stations.

P represents the transmission power of the MS, and the subscript k or j represents the sequence number of the MS;

H represents the second channel impulse response from the relay station to the BS;

$\sigma_v^2$ represents an uplink Interference signal power;

$\sigma_n^2$ represents an uplink noise power.

Formula (6) is transformed into the formula as follows.

$$\hat{s}_k = \underbrace{(w^H \text{diag}(g_k^T H) f_k s_k)}_{\text{Desired Signal}} + \quad (13)$$

$$\underbrace{w^H \text{diag}(g_k^T H) \sum_{j=1, j \neq k}^{M} f_j s_j}_{\text{Interference}} + \underbrace{w^H \text{diag}(g_k^T H) v + g_k^T n}_{\text{Colored noise}}.$$

(I) Determination of Optimization Conditions

In the embodiment of the present invention, the relay weight w* for the relay station to perform weighted processing on the received uplink signal is not a fixed value, but a target which needs to be optimized. In order to increase the network capacity, a total transmission power of relay stations may be reduced as much as possible while the SINR of the uplink signal received by the BS from any MS meets a preset requirement, that is, the relay weight w* is solved by minimizing the total transmission power of relay stations. Specifically, the SINR meets the following condition.

$$\min_w P_R$$

s.t. $SINR_k \geq \gamma_k$, for k=1, 2, ..., M  (14)

The optimization condition 1 represented by Formula (14) is as follows. The SINR of the uplink signal received by the BS from any MS reaches a preset value, and the total transmission power of the relay stations is minimized. In Formula (14), $\gamma_k$ represents the preset value of the SINR of the uplink signal received by the BS from any MS, the subscript k represents the sequence number of the MS, and $1 \leq k \leq M$. $P_R$ represents the total transmission power of relay stations, and may be determined by a formula as follows.

$$P_R = E\{t^H t\} = Tr\{w^H E(xx^H) w\} = w^H D w \quad (15)$$

In Formula (15), D is a self-defined diagonal matrix, and meets a formula as follows.

$$D \triangleq \text{diag}([R_x]_{1,1}, [R_x]_{2,2}, \ldots, [R_x]_{R,R})$$

$R_x$ represents a power sum of an autocorrelation matrix of all uplink channel impulse responses from the MS to the relay station and the Interference, $[R_x]_{1,1}$ represents a power sum in Row 1 and Column 1 of $R_x$, and $[R_x]_{R,R}$ represents a power sum in Row R and Column R of $R_x$. Specifically, $R_x$ meets a formula as follows.

$$R_x = \sum_{j=1}^{M} P_j R_f^j + \sigma_v^2 I \quad (16)$$

$R_f^j$ represents an autocorrelation matrix of the uplink channel impulse response from the $j^{th}$ MS to the $f^{th}$ relay station, and $SINR_K \geq \gamma_k$ may be expressed as follows.

$$\frac{w^H \text{diag}(g_k^T H)(P_j R_f^j) \text{diag}(g_k^T H)^H w}{w^H E w + \sigma_n^2 g_k^T g_k^*} \geq \gamma_k \quad (17)$$

E meets a formula as follows.

$$E = \text{diag}(g_k^T H)\left(\sum_{j=1, j\neq k}^{M} P_j R_f^j + \sigma_v^2 I\right) \text{diag}(g_k^T H)^H. \quad (18)$$

The optimization condition 1 represented by Formula (14) is rewritten according to Formulas (15-18) to obtain the formula as follows.

$$\text{s.t. } w^H U_k w \geq \gamma_k \sigma_n^2 g_k^T g_k^* \text{ for } k=1, 2, \ldots, M \quad (19)$$

Formula (19) is a nonconvex optimization problem, in which $U_k$ meets a formula as follows.

$$U_k = \text{diag}(g_k^T H)^H \left(P_k P_f^k - \gamma_k \sum_{j=1, j\neq k}^{M} P_j R_f^j - \gamma_k \sigma_v^2 I\right) \text{diag}(g_k^T H)^H. \quad (20)$$

(II) Global Optimal Value of Nonconvex Optimization Problem Calculated by Using Semidefinite Programming (SDP) Algorithm when Rank of Z is 1

In the embodiment of the present invention, the SDP algorithm may be used to solve a global optimal value of the nonconvex optimization problem, and the following formula is obtained.

$$Z = ww^H$$

$$\min_Z \text{Tr}(ZD)$$

$$\text{s.t. } \text{Tr}(ZU_k) \geq \gamma_k \sigma_n^2 g_k^T g_k^* \text{ for } k=1, 2, \ldots, M$$

$$Z \geq 0, \text{ and rank}(Z) = 1 \quad (21)$$

Z in Formula (21) is solved, and w corresponding to the obtained Z is the desired relay weight.

The nonconvex limitation is further relaxed on the basis of Formula (21), that is, the limitation of Rank(Z)=1 is removed, so as to obtain Formula (22).

$$\min_Z \text{Tr}(ZD)$$

$$\text{s.t. } \text{Tr}(ZU_k) \geq \gamma_k \sigma_n^2 g_k^T g_k^* \text{ for } k=1, 2, \ldots, M$$

$$Z \geq 0 \quad (22)$$

A relaxation variable $\beta_k$ is introduced, so Formula (22) may be expressed in a standard SDP form, so as to obtain Formula (23).

$$\min_{Z \in C^{R \times R}} \text{vec}(D)^T \text{vec}(z)$$

$$\text{s.t.} \text{vec}(U_k)\text{vec}(Z) - \beta_k = \gamma_k \sigma_n^2 g_k^T g_k^*$$

$$\beta_k \geq 0 \text{ for } k=1, 2, \ldots, M$$

$$Z \geq 0 \quad (23)$$

A global optimal value of the nonconvex optimization problem is solved by using the SDP algorithm when Rank(Z)=1. In a normal case, Formula (22) has a solution when Rank(Z)=1, and w corresponding to the solution is the desired relay weight. The relay station may perform weighted processing on the received uplink signal according to the relay weight and then send the uplink signal after weighted processing to the BS.

If Formula (23) has no solution when Rank(Z)=1, a global suboptimal value of the nonconvex optimization problem may be determined by using the following randomized algorithm.

(III) Suboptimal Value of Nonconvex Optimization Problem Solved by Using Randomized Algorithm when Rank of Z is not 1

The randomized algorithm is used for solving a corresponding relay weight when the transmission power of the relay station is minimum, the principle of which is calculation by using a method of randomized initialization selection of a unit vector. The randomized algorithm is specifically described as follows.

1. Z matrix $Z_{opt}$ is solved according to Formula (22) and the SDP algorithm, characteristic value decomposition is performed on $Z_{opt}$ to obtain $Z_{opt} = U\Sigma U^H$, and a random variable $w_l = D^{-1/2} U \Sigma^{-1/2} e_l$ is determined. U is a characteristic vector of Z matrix, $\Sigma$ is a characteristic value matrix of Z matrix, $w_l$ is an independent random variable, which is uniformly distributed on a unit circle in a complex plane, and $[e_1]_i = e^{j\theta_{1,i}}$. $\theta_{1,i}$ is a random variable uniformly distributed in $[0, 2\pi)$.

$w_l^H D w_l = \text{trace}(Z_{opt})$ can be proved, that is, the power of an individual relay station and the power sum of each relay station are fixed, so the selection of $e_1$ has no influence on the power of the individual relay station and the power sum of each relay station. In the practical application, a value of a certain $e_1$ may be randomly selected and $w_l$ corresponding to $e_1$ is used as an initial value of the independent random variable.

2. The value of $\theta_{1,i}$ is altered to obtain a set $w_l$, and it is determined whether Z corresponding to each independent random variable in the set $w_l$ meets Formula (22). If not, the independent random variable that does not meet Formula (22) is scaled (for example, multiplied by a certain constant), and if the scaled independent random variable meets Formula (22), $w_l$ meeting the limiting condition is used as a candidate value in the next random iteration.

3. If multiple $w_l$ meeting the limiting condition in the set $w_l$, Z corresponding to a $w_l$ candidate value with a minimum $w_l^H D w_l$ among $w_l$ meeting the limiting condition is determined as a suboptimal solution, and w corresponding to the suboptimal solution is the desired relay weight.

In the above optimization condition 1, an uplink SINR as high as possible is achieved with a total transmission power of the relay stations as low as possible, that is, the relay stations are considered as a whole. If the transmission power of an individual relay station is further considered based on the above optimization condition 1, specifically, the following condition may be met.

$$\min_w w^H D w \quad (24)$$

$$\text{s.t. } w^H \text{diag}(g_k^T H)$$

$$\left(P_k R_f^k - \gamma_k \sum_{j=1, j\neq k}^{M} P_j R_f^j - \gamma_k \sigma_v^2 I\right) \text{diag}(g_k^T H)^H w \geq \gamma_k \sigma_n^2 g_k^T g_k^*$$

for $k = 1, 2, \ldots, M$ $D_{i,i} |w_i|^2 \leq P_{Ri}$ for $i = 1, 2, \ldots, R$ Formula (24) represents an optimization condition 2, in which the transmission power of any relay station is lower than a preset power threshold value while a preset SINR value of the uplink signal received by the BS from any MS is reached, and the total transmission power of the relay stations is minimized. In Formula (24), $P_{Ri}$ represents the preset threshold value of the transmission power of the individual relay station, and $w^H Dw$ represents the total transmission power of the relay stations. The optimization condition 2 represented by Formula (24) is rewritten to obtain the formula as follows.

$$\min_Z Tr(ZD)$$

$$s.t.\ Tr(ZU_k) \geq \gamma_k \sigma_n^2 g_k^T g_k^*$$

$$Z_{i,i} \leq P_{Ri}/[D]_{i,i}\ \text{for}\ i=1, 2, \ldots, R$$

$$\text{and}\ Z \geq 0 \quad (25)$$

Formula (25) is a nonconvex optimization problem, and a global optimal value of the nonconvex optimization problem is solved by using the SDP algorithm. If Formula (25) has a solution when Rank(Z)=1, the solution corresponds to the relay weight. If Formula (25) has no solution when Rank(Z)=1, the global optimal value of the nonconvex optimization problem is solved by using the above randomized algorithm, and the optimal solution is used as the relay weight. The relay station can perform weighted processing on the uplink received signal according to the relay weight and then send the uplink received signal after weighted processing to the BS.

Based on the above theoretical basis, a method for jointly determining the demodulation matrix G and the relay weight w according to an embodiment of the present invention, and a technical solution in which the weighted transmission performed by the relay station according to the relay weight w and the weighted demodulation performed by the BS according to the demodulation matrix G are achieved, are described below with reference to the application scenario as shown in FIG. 3. The following specific blocks are included.

In Block 41, an iterative initial value of the relay weight is determined.

A beam vector w=c×vec(v) of the uplink signal received by the relay station is initialized, in which $v_i = e^{j\theta_i}$, $\theta_i$ is a uniformly distributed random variable in $[0, 2\pi)$, and c is a constant, the value of which is equal to or slightly greater than a noise power $\sigma_n^2$ induced by an antenna of the BS which receives the uplink relay signal.

In Block 42, an SINR threshold value $SINR_k$ of the uplink signal is determined according to a practical network environment.

In a specific implementation process, the threshold values of the uplink SINRs of different MSes may be same or different. Here, only determination of a same SINR threshold value $SINR_k$ for one or more MSes according to a practical network environment is described as an example.

If a number N of the receiving antennae of the BS is greater than a number R of the relay stations, the SINR threshold value $SINR_k$ of the uplink signal is $\lambda_{max}$, and $\lambda_{max}$ may be determined by using a lemma below.

Lemma: if the number of the receiving antennae at a target end is greater than or equal to the number of the relay stations, an asymptotic upper limit of the reachable SINR at the $k^{th}$ relay station is a maximal generalized characteristic value.

$$\lambda_{max}\left(P_k R_f^k,\ \sum_{j=1, j \neq k}^{M} P_j R_f^j + \sigma_v^2 I\right)$$

$R_f^j$ represents an autocorrelation matrix of an uplink channel from the $j^{th}$ MS to the $f^{th}$ relay station, $P_j$ represents a total power of the uplink signal received by the relay stations which is sent from the $j^{th}$ MS, and $\sigma_v^2$ represents an uplink Interface power.

A required value $\gamma_k$ of the uplink SINR required to be reached may be preset for different MSes according to the demands of the practical services or management strategies. After the SINR threshold value $SINR_k$ of the uplink signal in a practical network environment is determined by using the above method, it is required to verify whether the required value $\gamma_k$ of the uplink SINR is feasible according to the practically reachable SINR threshold value $SINR_k$ of the uplink signal in the network environment. If $SINR_K \geq \gamma_k$, it suggests that the set required value $\gamma_k$ of the uplink SINR is reachable; and otherwise, it indicates that the set required value $\gamma_k$ of the uplink SINR is unreachable in the practical network environment, and the required value $\gamma_k$ of the uplink SINR needs to be lowered, so the lowered required value $\gamma_k$ of the uplink SINR meets a condition $SINR_K \geq \gamma_k$.

In Block 43, an iterative initial value of the demodulation weight is determined according to an iterative value of the relay weight and the SINR threshold value $SINR_k$, so the main characteristic vector $g_k^*$ corresponding to the maximal characteristic value can be calculated according to Formula (12), and the demodulation matrix G can be obtained according to $g_k^*$.

If Block 43 is performed for the first time, the iterative value w of the relay weight is the iterative initial value of the relay weight determined in Block 41; and otherwise, the iterative value of the relay weight in Block 43 is the relay weight calculated in Block 44.

In Block 44, a relay weight w of the time a total transmission power of the relay stations is minimum is calculated according to the calculated demodulation matrix G and Formula (22), or a relay weight w is calculated according to the calculated demodulation matrix G and Formula (25), where the relay weight w is of the time a total transmission power of the relay stations is minimum and a transmission power of each relay station is lower than or equal to a preset threshold value of the power.

The determination of the relay weight w is a nonconvex optimization problem, and a global optimal value of the nonconvex optimization problem may be solved by using the above SDP algorithm. The global optimal value Z of Formula (22) or (25) when Rank(Z)=1 is solved, and w corresponding to the global optimal value Z is the desired relay weight. If Formula (22) or (25) has no global optimal value when Rank (Z)=1, a suboptimal value of the nonconvex optimization problem is solved by using the above randomized algorithm, and w corresponding to the suboptimal solution is the desired relay weight.

In Block 45, Blocks 43 and 44 are alternatively performed, till the minimal value of the total transmission power of relay stations is converged into a certain fixed value in the iteration process, and the relay weight w and the demodulation matrix G corresponding to the fixed value are the desired relay weight and demodulation matrix.

If the total transmission power of the relay stations has a lower limit (that is, the total transmission power of the relay stations has a minimum value), after iterations in Blocks 43 and 44 are alternatively performed, the total transmission power of the relay stations decreases, and it can be determined that the total transmission power of the relay stations is converged into a certain fixed value after multiple iterations by using the above algorithm. The relay weight w and the demodulation matrix G corresponding to the fixed value are the desired relay weight and demodulation matrix.

In Block 46, the relay station performs weighted processing on a received uplink signal x sent from the MS to the BS according to the relay weight w determined in Block 45 to obtain an uplink relay weighted signal t, and sends the uplink relay weighted signal t to the BS. In this block, a relation between t and w meets Formula (3).

In Block 47, the BS receives an uplink relay weighted signal y (a relation between t and y meets Formula (4)), and performs weighted demodulation on the uplink relay weighted signal y received by the BS according to the demodulation vector G determined in Block 45, so as to obtain an uplink estimation signal ŝ. In Block 47, the relation between t and y meets Formula (4), and relations between ŝ, G, and y meet Formula (5).

Figure 4:
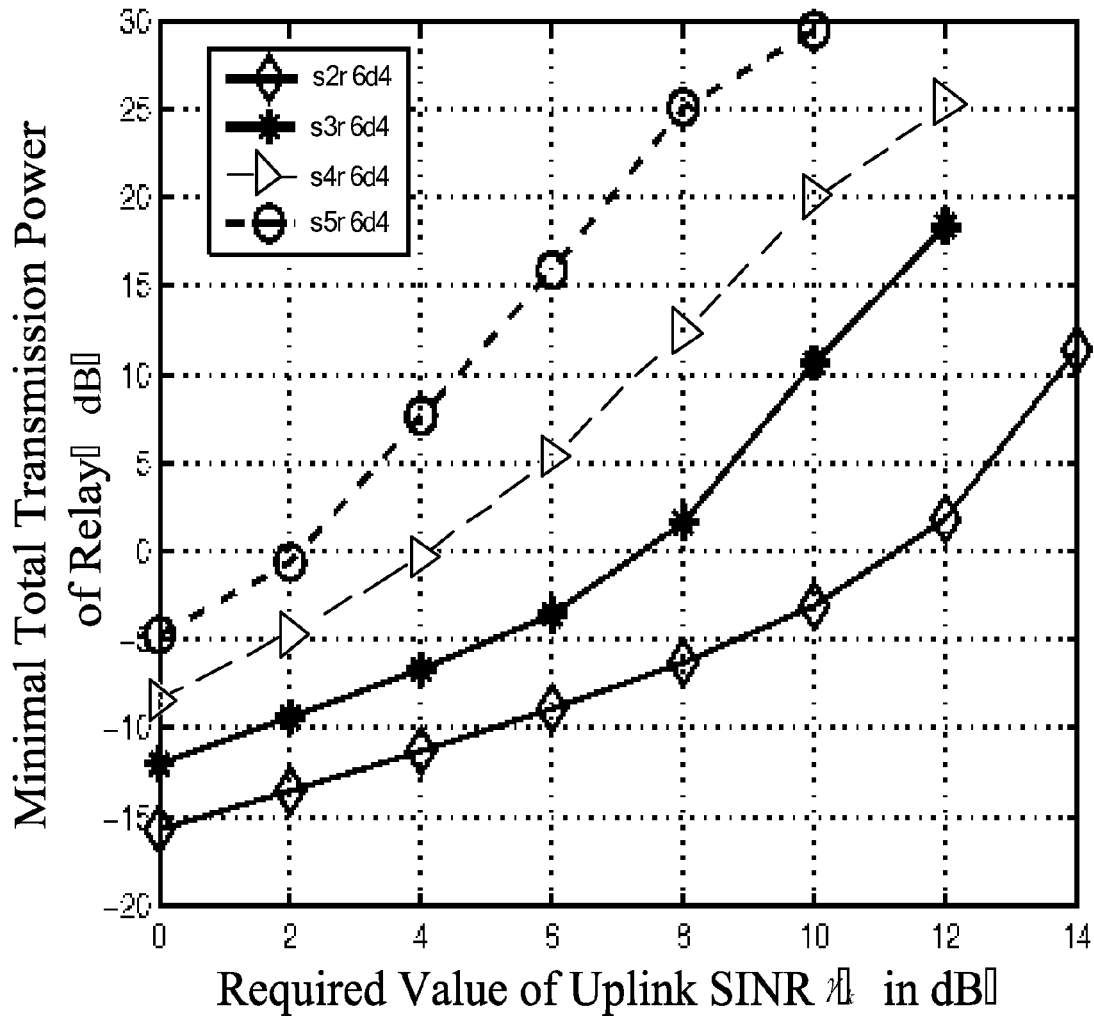
FIG. 4 is a schematic view of a relation between an SINR and a minimal total transmission power of relay stations according to an embodiment of the present invention.
Figure 5:
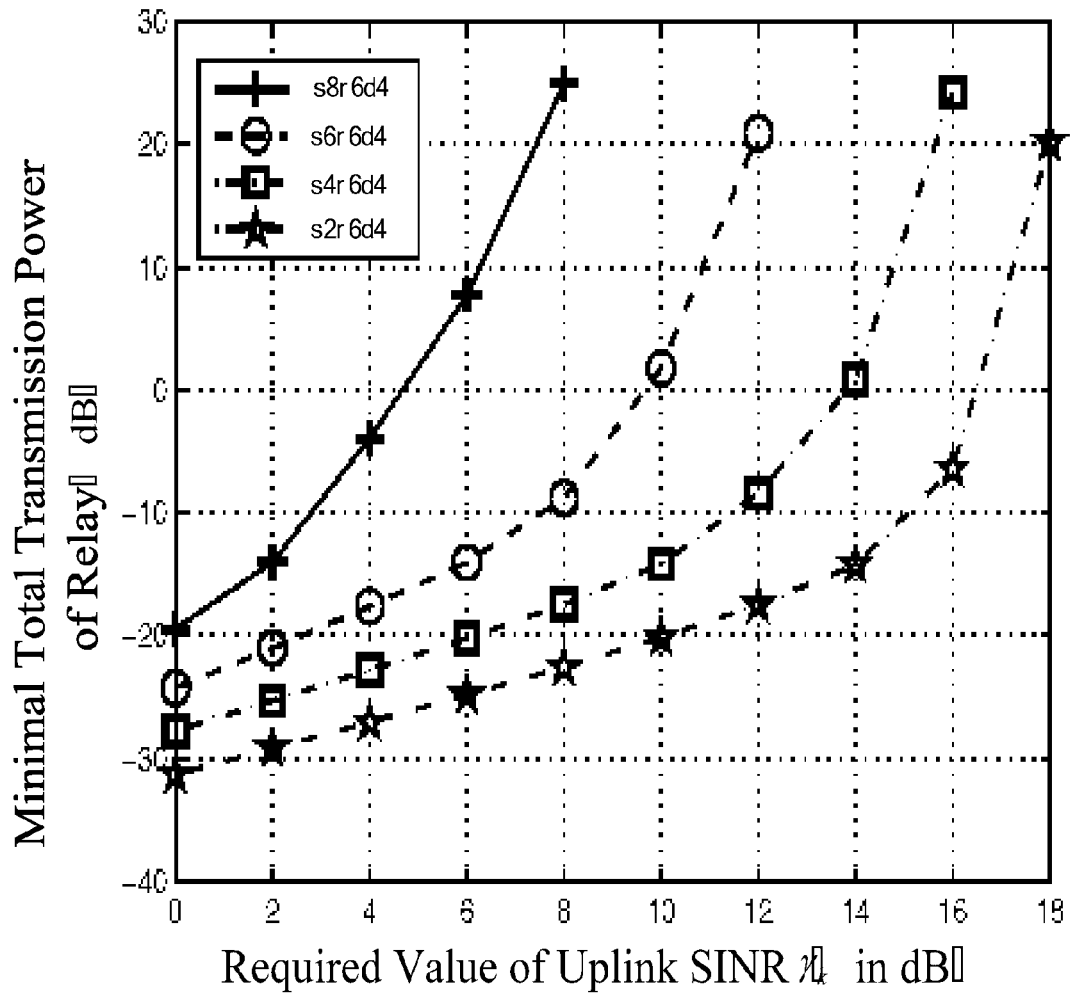
FIG. 5 is a schematic view of a relation between an SINR and a minimal total transmission power of relay stations according to another embodiment of the present invention.

The inventors employ a simulation technical means in implementing the embodiment of the present invention to perform simulation analysis on experimental data in the method for sending and receiving signals according to the embodiments of the present invention. FIG. 4 is a schematic view of a relation between an SINR and a minimal total transmission power of relay stations according to an embodiment of the present invention. FIG. 5 is a schematic view of a relation between an SINR and a minimal total transmission power of relay stations according to another embodiment of the present invention. In FIGS. 4 and 5, the horizontal coordinate represents an SINR of an uplink signal, the vertical coordinate represents a minimal total transmission power of the relay stations, and "s2r6n6" represents that 2 MSes (s), 6 relay stations (r), and 1 BS having 6 antennas (n) are deployed in the system, and the expressions of other numbers have similar meanings and are not described here again. FIGS. 4 and 5 show that when the same number of relay stations and the BS having the same number of antennas are deployed in the system, if a same SINR needs to be achieved, the minimal total transmission power of the relay stations required for the relay stations to transmit uplink signals increases with the increasing number of the MSes, and the minimal total transmission power of the relay stations required for the relay stations to transmit uplink signals is converged. It can be seen that the use of the uplink signal weighted processing method according to the embodiments of the present invention to perform weighted processing on the uplink signal can efficiently satisfy the requirement of the preset uplink SINR, and minimize the transmission power of the relay station, thereby facilitating the optimization of the network capacity and the improvement of the communication quality.

Figure 6:
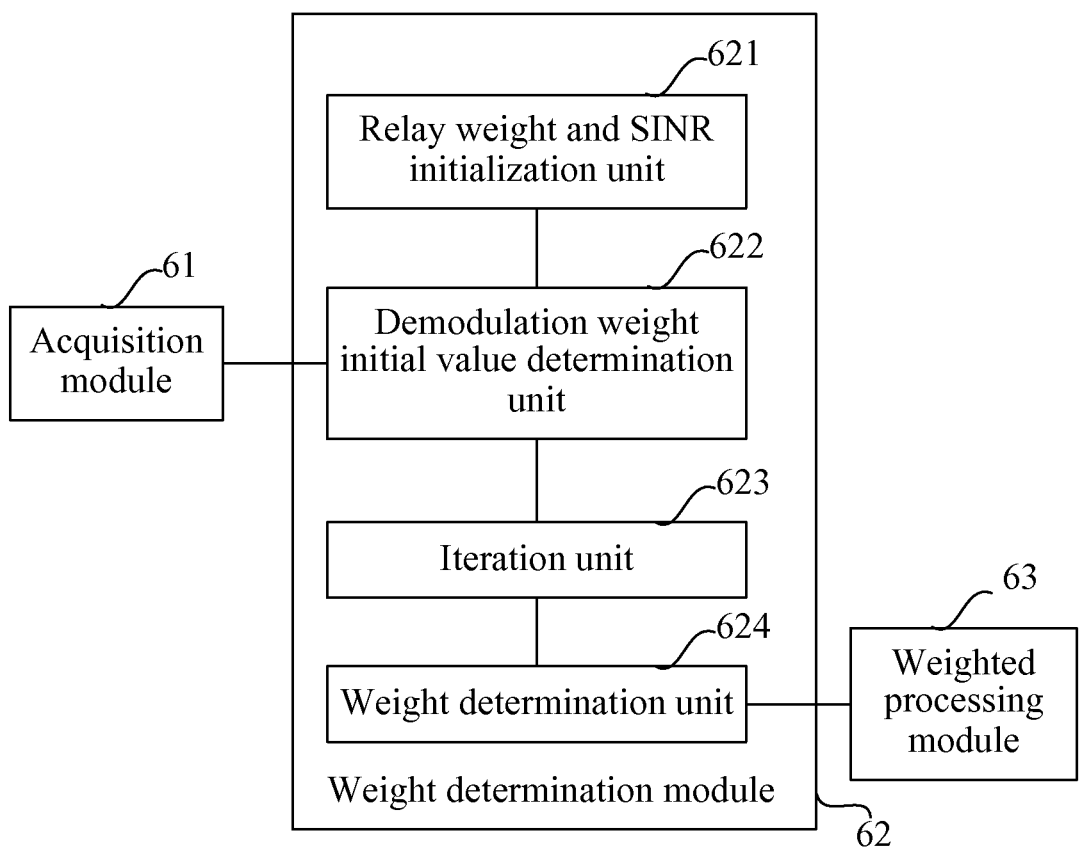
FIG. 6 is a schematic structural view of an uplink signal weighted processing device according to an embodiment of the present invention.

FIG. 6 is a schematic structural view of an uplink signal weighted processing device according to an embodiment of the present invention. As shown in FIG. 6, in the embodiment, the uplink signal weighted processing device includes an acquisition module 61, a weight determination module 62, and a weighted processing module 63.

The acquisition module 61 is configured to obtain a first channel impulse response from an MS to a relay station, and a second channel impulse response from the relay station to a BS.

The weight determination module 62 is configured to determine a relay weight and a demodulation weight according to the first channel impulse response and the second channel impulse response.

The weighted processing module 63 is configured to send the relay weight and the demodulation weight respectively to the relay station and the BS, so as to enable the relay station to perform weighted processing on an MS uplink signal received by the relay station according to the relay weight to obtain an uplink relay weighted signal and send the uplink relay weighted signal to the BS, and enable the BS to perform demodulation weighted processing on the uplink relay weighted signal received by the BS according to the demodulation weight to obtain an uplink estimation signal corresponding to the MS uplink signal.

Based on the above technical solution, the weight determination module 62 may optionally include a relay weight and SINR initialization unit 621, a demodulation weight initial value determination unit 622, an iteration unit 623, and a weight determination unit 624.

The relay weight and SINR initialization unit 621 is configured to determine an iterative initial value of the relay weight and a threshold value of an uplink SINR.

The demodulation weight initial value determination unit 622 is configured to determine an iterative initial value of the demodulation weight according to the iterative initial value of the relay weight, the threshold value of the uplink SINR, the first channel impulse response, and the second channel impulse response.

The iteration unit 623 is configured to determine an iterative value of the relay weight of the time the threshold value of the uplink SINR is reached and a total transmission power of relay stations is minimum according to the iterative initial value of the demodulation weight; determine an iterative value of the demodulation weight according to the iterative value of the relay weight, the threshold value of the uplink SINR, and the second channel impulse response; redetermine an iterative value of the relay weight of the time the threshold value of the uplink SINR is reached and a total transmission power of the relay stations is minimum according to the iterative value of the demodulation weight; redetermine an iterative value of the demodulation weight according to the redetermined iterative value of the relay weight, the threshold value of the uplink SINR, and the second channel impulse response; and repeat the iteration till the minimal value of the total transmission power of the relay stations is converged into a certain fixed value.

The weight determination unit 624 is configured to respectively determine the iterative value of the relay weight and the iterative value of the demodulation weight of the time the minimal value of the total transmission power of the relay stations is converged into a certain fixed value as the relay weight and the demodulation weight.

Based on the above technical solution, in a case that an upper limit of a transmission power of an individual relay station is further taken into account in determination of the relay weight to improve the feasibility of the solution, optionally, the iteration unit 623 may be further configured to determine a iterative value of the relay weight of the time the threshold value of the uplink SINR is reached, a total transmission power of relay stations is minimum, and a transmission power of any relay station is equal to or lower than a preset threshold value according to the iterative initial value of the demodulation weight; determine an iterative value of the demodulation weight according to the iterative value of the relay weight, the threshold value of the uplink SINR, and the second channel impulse response; redetermine a iterative value of the relay weight of the time the threshold value of the uplink SINR is reached, a total transmission power of relay stations is minimum, and the transmission power of any relay station is equal to or lower than a preset threshold value according to the iterative value of the demodulation weight; redetermine an iterative value of the demodulation weight according to the redetermined iterative value of the relay weight, the threshold value of the uplink SINR, and the second channel impulse response; and repeat the iteration till the minimal value of the total transmission power of the relay stations is converged into a certain fixed value.

In the embodiment, the uplink signal weighed processing device determines the relay weight used for performing weighted processing on the MS uplink signal received by the relay station for the relay station, and determines the demodulation weight used for performing demodulation weighted processing on the uplink relay weighted signal received by the BS for the BS, that is, the uplink signal is respectively optimized at a relay station and a BS, thereby facilitating the optimization of the network capacity and the improvement of the communication quality. In this embodiment, an implementation entity of the uplink signal weighted processing device is not limited, for example, the uplink signal weighted processing device may be disposed independently or integrated with the relay station or the BS. The mechanism of implementing the uplink signal weighted processing can be referred to FIGS. 1 to 5 and the descriptions in the uplink signal weighed processing method according to the embodiment of the present invention, and is not described here again.

Figure 7:
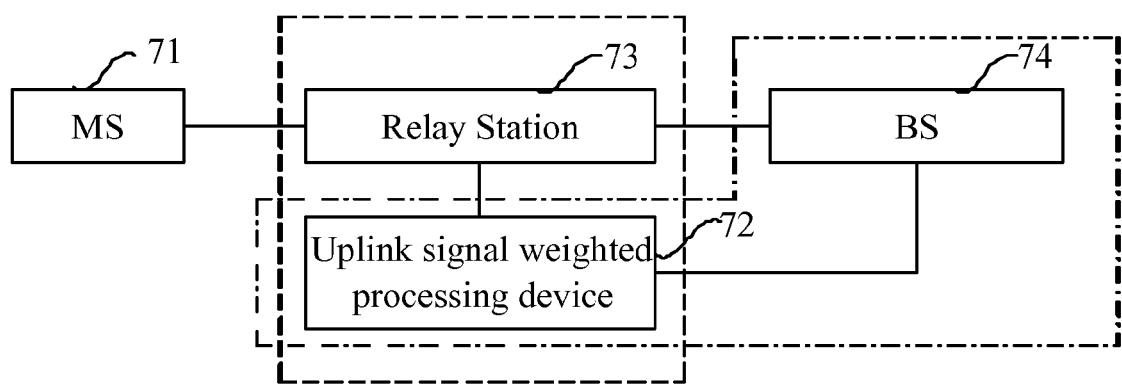
FIG. 7 is a schematic structural view of a communication system according to an embodiment of the present invention.

FIG. 7 is a schematic structural view of a communication system according to an embodiment of the present invention. As shown in FIG. 7, in the embodiment, the communication system includes an MS 71, an uplink signal weighted processing device 72, a relay station 73, and a BS 74.

The MS 71 is configured to send an MS uplink signal.

The uplink signal weighted processing device 72 is configured to obtain a first channel impulse response from the MS to the relay station and a second channel impulse response from the relay station to the BS, determine a relay weight and a demodulation weight according to the first channel impulse response and the second channel impulse response, and send the relay weight and the demodulation weight respectively to the relay station 73 and the BS 74.

The relay 73 is configured to perform weighted processing on the MS uplink signal received by the relay station 73 according to the relay weight to obtain an uplink relay weighted signal, and send the uplink relay weighted signal to the BS 74.

The BS 74 is configured to perform demodulation weighted processing on the uplink relay weighted signal received by the BS according to the demodulation weight, so as to obtain an uplink estimation signal corresponding to the MS uplink signal.

In the technical solution above, an implementation entity of the uplink signal weighted processing device 72 is not limited, and optionally, the uplink signal weighted processing device 72 may be disposed independently, or integrated with the relay station 73 or the BS 74 as a functional module. Details of the functional structures of the uplink signal weighted processing device 72 can be referred to the descriptions in the corresponding embodiment in FIG. 6, and is not described here again.

In the technical solution above, in the communication system, the numbers of the MSes, the relay stations, and the BSes may be deployed according to practical demands, and optionally, the MS may be a single-antenna MS, the relay station may be a single-antenna relay, and the BS may be a multi-antenna BS. In the communication system, all nodes interact to realize weighted processing of the uplink signal, the mechanism of which can be referred to FIGS. 1 to 3 and the description in the uplink signal weighted processing method according to the embodiment of the present invention, and is not described here again.

In this embodiment, the communication system determines the relay weight used for performing weighted processing on the MS uplink signal received by the relay station for the relay station, and determines the demodulation weight used for performing demodulation weighted processing on the uplink relay weighted signal received by the BS for the BS, and thus the uplink signal is optimized at a relay station and a BS, thereby facilitating the optimization of the network capacity and the improvement of the communication quality. It should be understood by persons skilled in the art that the accompanying drawings are merely schematic views of an embodiment, and modules or processes in the accompanying drawings are not necessarily required for implementing the present invention.

It should be understood by persons skilled in the art that, modules in a device according to an embodiment may be distributed in the device of the embodiment according to the description of the embodiment, or may be correspondingly changed to be disposed in one or more devices different from this embodiment. The modules of the above embodiment may be combined into one module or further divided into a plurality of sub-modules.

The sequence numbers of the above embodiments of the present invention are merely for convenience of description, and do not imply the preference among the embodiments.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a read only memory (ROM), a random access memory (RAM), a magnetic disk, and an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the scope of the present invention.

What is claimed is:

1. An uplink signal weighted processing method, comprising:

acquiring a first channel impulse response from a Mobile Station (MS) to a relay station, and a second channel impulse response from the relay station to a Base Station (BS);

determining a relay weight and a demodulation weight according to the first channel impulse response and the second channel impulse response, wherein determining the relay weight and the demodulation weight comprises determining an iterative initial value of the relay weight; and sending the relay weight to the relay station and sending the demodulation weight to the BS, so as to enable the relay station to perform weighted processing on an MS uplink signal received by the relay station according to the relay weight to obtain an uplink relay weighted signal and to send the uplink relay weighted signal to the BS, and so as to enable the BS to perform demodulation weighted processing on the uplink relay weighted signal received by the BS according to the demodulation weight to obtain an uplink estimation signal corresponding to the MS uplink signal, wherein determining the relay weight and the demodulation weight further comprises:

determining a threshold value of an uplink Signal to Noise Ratio (SINR);

determining an iterative initial value of the demodulation weight according to the iterative initial value of the relay weight, the threshold value of the uplink SINR, the first channel impulse response and the second channel impulse response;

determining an iterative value of the relay weight of the time when the threshold value of the uplink SINR is reached and a total transmission power of a plurality of relay stations is minimum according to the iterative initial value of the demodulation weight;

determining an iterative value of the demodulation weight according to the iterative value of the relay weight, the threshold value of the uplink SINR, and the second channel impulse response;

redetermining an iterative value of the relay weight of the time the threshold value of the uplink SINR is reached and a total transmission power of the plurality of relay stations is minimum according to the iterative value of the demodulation weight;

redetermining an iterative value of the demodulation weight according to the redetermined iterative value of the relay weight, the threshold value of the uplink SINR, and the second channel impulse response; and repeating redetermining an iterative value of the relay weight and redetermining an iterative value of the demodulation weight until a minimal value of the total transmission power of the plurality of relay stations is converged into a fixed value thereby determining respectively a final iterative value of the relay weight and a final iterative value of the demodulation weight of the time the minimal value of the total transmission power of the plurality of relay stations is converged into a certain fixed value as the relay weight and the demodulation weight.

2. The uplink signal weighted processing method according to claim 1, wherein:

the iterative initial value of the demodulation weight or the iterative value of the demodulation weight is a main characteristic vector corresponding to a maximal characteristic value of a demodulation weight matrix determined by using a formula as follows:

$$g_k^* = \wp\{B^{-1}A\}$$

wherein:

$$A = P_k H w^H R_f^k w H^H$$

$$B = H w^H \left( \sum_{j=1, j \neq k}^{M} P_j R_f^j \right) w H^H + \sigma_v^2 H w^H w H^H + \sigma_v^2 I$$

wherein the iterative value of the relay weight is a global optimal solution to a formula below when Rank(Z)=1:

$$\min_z Tr(ZD)$$

$$s.t.\ Tr(ZU_k) \geq \gamma_k \sigma_n^2\ g_k^T g_k^*$$

$$Z \geq 0$$

wherein:

$$Z = ww^H$$

$$U_k = \mathrm{diag}(g_k^T H) \left( P_k R_f^k - \gamma_k \sum_{j=1, j \neq k}^{M} P_j R_f^j - \gamma_k \sigma_v^2 I \right) \mathrm{diag}(g_k^T H)^H$$

$$D \triangleq \mathrm{diag}([R_x]_{1,1},\ [R_x]_{2,2},\ \ldots,\ [R_x]_{R,R})$$

$$R_x = \sum_{j=1}^{M} P_j R_f^j + \sigma_v^2 I$$

where $g_k^*$ represents the main characteristic vector corresponding to the maximal characteristic value of the demodulation weight matrix;

$\wp\{\ \}$ represents a solution of the main characteristic vector;

w represents the initial value of the relay weight or the iterative value of the relay weight;

Tr(ZD) represents the total transmission power of the relay stations;

$R_f^k$ represents an autocorrelation matrix of the first channel impulse response from a $k^{th}$ MS to a $f^{th}$ relay station, and $R_f^j$ represents an autocorrelation matrix of the first channel impulse response from a $j^{th}$ MS to the $f^{th}$ relay station, the superscript k or j represents a sequence number of the MS, $1 \leq k \leq M$, $1 \leq j \leq M$, $j \neq k$, M represents a total number of the MSes, the subscript f represents a sequence number of the relay station, $1 \leq f \leq R$, and R represents a total number of the relay stations;

P represents a transmission power of the MS, and the subscript k or j represents the sequence number of the MS;

H represents the second channel impulse response from the relay station to the BS;

$R_x$ represents a power sum of an autocorrelation matrix of all uplink channel impulse responses from the MS to the relay station and the Interference, $[R_x]_{1,1}$ represents a power sum in Row 1 and Column 1 of $R^x$, and $[R_x]_{R,R}$ represents a power sum in Row R and Column R of $R_x$ $\sigma_v^2$ represents an uplink Interference signal power; and $\sigma_n^2$ represents an uplink noise power.

3. The uplink signal weighted processing method according to claim 1, wherein determining or redetermining the iterative value of the relay weight of the time the threshold value of the uplink SINR is reached and the total transmission power of the plurality of relay stations is minimum according to the iterative initial value of the demodulation weight or the iterative value of the demodulation weight, comprises:

determining or redetermining a iterative value of the relay weight of the time the threshold value of the uplink SINR is reached, a total transmission power of the plurality of relay stations is minimum, and a transmission power of any relay station is lower than or equal to a preset threshold value according to the iterative initial value of the demodulation weight or the iterative value of the demodulation weight.

4. The uplink signal weighted processing method according to claim 3, wherein the iterative initial value of the demodulation weight or the iterative value of the demodulation weight is a main characteristic vector corresponding to a maximal characteristic value of a demodulation weight matrix determined by using a formula as follows:

$$g_k^* = \wp\{B^{-1}A\}$$

wherein:

$$A = P_k H w^H R_f^k w H^H$$

$$B = H w^H \left( \sum_{j=1, j \neq k}^{M} P_j R_f^j \right) w H^H + \sigma_v^2 H w^H w H^H + \sigma_v^2 I$$

the iterative value of the relay weight is a global optimal solution to a formula as follows when Rank(Z)=1:

$$\min_z Tr(ZD)$$

$$s.t.\ Tr(ZU_k) \geq \gamma_k \sigma_n^2\ g_k^T g_k^*$$

$$Z_{i,i} \leq P_{Ri}/[D]_{i,i}\ \text{for}\ i=1, 2, \ldots, R\ \text{and}\ Z \geq 0$$

wherein:

$$Z = w w^H$$

$$U_k = \text{diag}(g_k^T H) \left( P_k R_f^k - \gamma_k \sum_{j=1, j \neq k}^{M} P_j R_f^j - \gamma_k \sigma_v^2 I \right) \text{diag}(g_k^T H)^H$$

$$D \triangleq \text{diag}([R_x]_{1,1},\ [R_x]_{2,2},\ \ldots,\ [R_x]_{R,R})$$

$$R_x = \sum_{j=1}^{M} P_j R_f^j + \sigma_v^2 I$$

$g_k^*$ represents the main characteristic vector corresponding to the maximal characteristic value of the demodulation weight matrix;

$\wp\{\ \}$ represents a solution of the main characteristic vector;

w represents the initial value of the relay weight or the iterative value of the relay weight;

Tr(ZD) represents the total transmission power of the relay stations;

$R_f^k$ represents an autocorrelation matrix of the first channel impulse response from a $k^{th}$ MS to a $f^{th}$ relay station, $R_f^j$ represents an autocorrelation matrix of the first channel impulse response from a $J^{th}$ MS to the $f^{th}$ relay station, the superscript k or j represents a sequence number of the MS, 1≤k≤M, 1≤j≤M, j≠k, M represents a total number of the MSes; and the subscript f represents a sequence number of the relay station, 1≤f≤R, and R represents a total number of the relay stations;

P represents a transmission power of the MS, and the subscript k or j represents a sequence number of the MS;

H represents the second channel impulse response from the relay station to the BS;

$R_x$ represents a power sum of an autocorrelation matrix of all uplink channel impulse responses from the MS to the relay station and the Interference, $[R_x]_{1,1}$ represents a power sum in Row 1 and Column 1 of $R_x$, and $[R_x]_{R,R}$ represents a power sum in Row R and Column R of $R_x$;

$\sigma_v^2$ represents an uplink Interference signal power;

$\sigma_n^2$ represents an uplink noise power; and $P_{Ri}$ represents the preset threshold value of the transmission power of an individual relay station.

5. An uplink signal weighted processing device, comprising:

an acquisition module, configured to acquire a first channel impulse response from a Mobile Station (MS) to a relay station and a second channel impulse response from the relay station to a Base Station (BS);

a weight determination module, configured to determine a relay weight and a demodulation weight according to the first channel impulse response and the second channel impulse response, wherein determining the relay weight and the demodulation weight comprises determining an iterative initial value of the relay weight; and a weighted processing module, configured to send the relay weight to the relay station and to send the demodulation weight to the BS, so as to enable the relay station to perform weighted processing on an MS uplink signal received by the relay station according to the relay weight to obtain an uplink relay weighted signal and to send the uplink relay weighted signal to the BS, and so as to enable the BS to perform demodulation weighted processing on the uplink relay weighted signal according to the demodulation weight to obtain an uplink estimation signal corresponding to the MS uplink signal, wherein the weighted determination module comprises:

a relay weight and a Signal to Noise Ratio (SINR) initialization unit, configured to determine an iterative initial value of the relay weight and a threshold value of an uplink SINR;

a demodulation weight initial value determination unit, configured to determine an iterative initial value of the demodulation weight according to the iterative initial value of the relay weight, the threshold value of the uplink SINR, the first channel impulse response and the second channel impulse response;

an iteration unit, configured to: determine the iterative value of the relay weight of the time the threshold value of the uplink SINR is reached and a total transmission power of a plurality of relay stations is minimum according to the iterative initial value of the demodulation weight; determine an iterative value of the demodulation weight according to the iterative value of the relay weight, the threshold value of the uplink SINR, and the second channel impulse response; redetermine an iterative value of the relay weight of the time the threshold value of the uplink SINR is reached and a total transmission power of the plurality of relay stations is minimum according to the iterative value of the demodulation weight; redetermine an iterative value of the demodulation weight according to the redetermined iterative value of the relay weight, the threshold value of the uplink SINR, and the second channel impulse response; and repeat the iteration until a minimal value of the total transmission power of the plurality of relay stations is converged into a certain fixed value; and a weight determination unit, configured to determine respectively the iterative value of the relay weight and the iterative value of the demodulation weight of the time the minimal value of the total transmission power of the plurality of relay stations is converged into a certain fixed value as the relay weight and the demodulation weight.

6. The uplink signal weighted processing device according to claim 5, wherein:
the iteration unit is further configured to determine an iterative value of the relay weight of the time the threshold value of the uplink SINR is reached, a total transmission power of the plurality of relay stations is minimum, and a transmission power of any relay station is equal to or lower than a preset threshold value according to the iterative initial value of the demodulation weight, determine an iterative value of the demodulation weight according to the iterative value of the relay weight, the threshold value of the uplink SINR, and the second channel impulse response, redetermine an iterative value of the relay weight of the time the threshold value of the uplink SINR is reached, a total transmission power of relay stations is minimum, and the transmission power of any relay station is equal to or lower than a preset threshold value according to the iterative value of the demodulation weight, redetermine an iterative value of the demodulation weight according to the redetermined iterative value of the relay weight, the threshold value of the uplink SINR, and the second channel impulse response, and repeat the iteration till the minimal value of the total transmission power of the relay stations is converged into a certain fixed value.

7. The uplink signal weighted processing device according to claim 5, wherein uplink signal weighted processing device is integrated with the relay station.

8. The uplink signal weighted processing device according to claim 5, wherein uplink signal weighted processing device is integrated with the base station.

9. A communication system, comprising:
a base station;
a relay station;
a mobile station; and
an uplink signal weighted processing device, configured to acquire a first channel impulse response from a mobile station to a relay station and a second channel impulse response from the relay station to a base station, to determine a relay weight and a demodulation weight according to the first channel impulse response and the second channel impulse response, and to send the relay weight to the relay station and the demodulation weight to the base station, wherein determining the relay weight and the demodulation weight comprises determining an iterative initial value of the relay weight;
wherein the relay station is configured to perform weighted processing on an mobile station uplink signal received by the relay station according to the relay weight to obtain an uplink relay weighted signal, and to send the uplink relay weighted signal to the base station;
wherein the base station is configured to perform demodulation weighted processing on the uplink relay weighted signal according to the demodulation weight to obtain an uplink estimation signal corresponding to the mobile station uplink signal; and
wherein determining the relay weight and the demodulation weight further comprises determining a threshold value of an uplink Signal to Noise Ratio (SINR), and determining an iterative initial value of the demodulation weight according to the iterative initial value of the relay weight, the threshold value of the uplink SINR, the first channel impulse response and the second channel impulse response.

10. The communication system according to claim 9, wherein the uplink signal weighted processing device is integrated with the relay station.

11. The communication system according to claim 9, wherein the uplink signal weighted processing device is integrated with the base station.

12. The communication system according to claim 9, wherein the mobile station is a single-antenna MS, the relay station is a single-antenna relay station, and the base station is a multi-antenna base station.

13. The communication system according to claim 9, wherein determining the relay weight and the demodulation weight further comprises:
determining an iterative value of the relay weight of the time when the threshold value of the uplink SINR is reached and a total transmission power of a plurality of relay stations is minimum according to the iterative initial value of the demodulation weight.

14. The communication system according to claim 13, wherein determining the relay weight and the demodulation weight further comprises:
determining an iterative value of the demodulation weight according to the iterative value of the relay weight, the threshold value of the uplink SINR, and the second channel impulse response.

15. The communication system according to claim 14, wherein determining the relay weight and the demodulation weight further comprises:
redetermining an iterative value of the relay weight of the time the threshold value of the uplink SINR is reached and a total transmission power of the plurality of relay stations is minimum according to the iterative value of the demodulation weight.

16. The communication system according to claim 15, wherein determining the relay weight and the demodulation weight further comprises:
redetermining an iterative value of the demodulation weight according to the redetermined iterative value of the relay weight, the threshold value of the uplink SINR, and the second channel impulse response.

17. The communication system according to claim 16, wherein determining the relay weight and the demodulation weight further comprises:
repeating redetermining an iterative value of the relay weight and redetermining an iterative value of the demodulation weight until a minimal value of the total transmission power of the plurality of relay stations is converged into a fixed value thereby determining respectively a final iterative value of the relay weight and a final iterative value of the demodulation weight of the time the minimal value of the total transmission power of the plurality of relay stations is converged into a certain fixed value as the relay weight and the demodulation weight.

* * * * *

UNITED STATES PATENT AND TRADEMARK OFFICE
CERTIFICATE OF CORRECTION

PATENT NO. : 8,600,294 B2  
APPLICATION NO. : 12/944484  
DATED : December 3, 2013  
INVENTOR(S) : Zheng Yi Page 1 of 1

It is certified that error appears in the above-identified patent and that said Letters Patent is hereby corrected as shown below:

In the Claims:

In Col. 17, lines 63-64, claim 2, delete " $B = Hw^H \left( \sum_{j=1, j \neq k}^{M} P_j R_f^j \right) wH^H + \sigma_v^2 Hw^H wH^H + \sigma_v^2 I$ "

and insert -- $B = Hw^H \left( \sum_{j=1, j \neq k}^{M} P_j R_f^j \right) wH^H + \sigma_v^2 Hw^H wH^H + \sigma_n^2 I$ --.

In Col. 18, line 19, claim 2, delete " $D \triangleq diag([R_x]_{1,1}, [R_x]_{2,2}, ..., [R_x]_{R,R})$ " and insert -- $D \triangleq diag([R_x]_{1,1}, [R_x]_{2,2}, ..., [R_x]_{R,R})$ --.

In Col. 18, line 53, claim 2, delete "Row 1 Column 1 of R$^x$" and insert --Row 1 and Column 1 of R$_x$,--.

In Col. 18, line 54, claim 2, insert --;-- after Column R of R$_x$.

In Col. 19, lines 18-19, claim 4, delete " $B = Hw^H \left( \sum_{j=1, j \neq k}^{M} P_j R_f^j \right) wH^H + \sigma_v^2 Hw^H wH^H + \sigma_v^2 I$ " and insert -- $B = Hw^H \left( \sum_{j=1, j \neq k}^{M} P_j R_f^j \right) wH^H + \sigma_v^2 Hw^H wH^H + \sigma_n^2 I$ --.

In Col. 19, line 41, claim 4, delete " $D \triangleq diag([R_x]_{1,1}, [R_x]_{2,2}, ..., [R_x]_{R,R})$ " and insert -- $D \triangleq diag([R_x]_{1,1}, [R_x]_{2,2}, ..., [R_x]_{R,R})$ --.

In Col. 19, line 60, claim 4, delete "J$^{th}$" and insert --j$^{th}$--.

In Col. 21, line 55, claim 9, delete "an mobile" and insert --a mobile--.

Signed and Sealed this  
Fifteenth Day of April, 2014

Michelle K. Lee  
*Deputy Director of the United States Patent and Trademark Office*